United States Patent
Asano et al.

[11] 3,886,570
[45] May 27, 1975

[54] AUTO-PROCESS CAMERA

[75] Inventors: Yoshio Asano, Hyogo; Kinji Ohkubo, Minami Ashigara, both of Japan

[73] Assignee: Fuji Photo Film Co., Ltd., Minami Ashigara-Shi, Japan

[22] Filed: Feb. 13, 1974

[21] Appl. No.: 442,256

[30] Foreign Application Priority Data
Feb. 13, 1973  Japan .................. 48-17709

[52] U.S. Cl. .................. 354/86; 354/174
[51] Int. Cl. .................. G03b 17/50
[58] Field of Search ........ 354/83, 85, 86, 174, 176, 354/186, 275, 276

[56] References Cited
UNITED STATES PATENTS

| | | | |
|---|---|---|---|
| 458,907 | 9/1891 | Kipper et al. | 354/174 |
| 2,496,630 | 2/1950 | Land | 354/86 |
| 3,691,920 | 9/1972 | Harvey | 354/86 |
| 3,741,095 | 6/1973 | Harvey | 354/86 |
| 3,748,990 | 7/1973 | Erlichman | 354/186 |

*Primary Examiner*—Fred L. Braun
*Attorney, Agent, or Firm*—Sughrue, Rothwell, Mion, Zinn and Macpeak

[57] ABSTRACT

An auto-process camera comprising an integrally formed accommodation structure into which exposed and processed monosheets are automatically supplied, this transfer to the accommodation structure being accompanied by no more bending of the monosheets than that to which monosheets might be subjected during normal handling thereof, whereby a photographer need be concerned only with taking photographs in a desired manner and does not have to be concerned with simultaneously trying to handle a camera and processed monosheets extruded from the camera.

8 Claims, 23 Drawing Figures

Patented May 27, 1975 3,886,570

AUTO-PROCESS CAMERA

The present invention relates to a photographic camera, and more particularly to an auto-process camera.

There is known a type of camera, which, using a special type of film which is a combination of a negative film, positive film, and sac containing a solution of processing chemicals, makes it possible to obtain a positive image of an object to which the film has been exposed without proceeding to a special location for the development of films, since an exposed film is developed within the camera, and a positive print of a photographed object is automatically extruded from the camera. Such cameras go under a variety of popular or trade names, such as auto-print, instant-developer, auto-process camera, or similar appellations, and the type of film associated therewith is referred to by various names, such as filmsheet, or monosheet. For the purposes of the present description, this type of film will be referred to as an auto-process camera, and the type of film associated therewith as monosheet.

Conventional auto-process cameras, although presenting advantages in that a photogtapher is able to obtain a positive print of a photographed object in a comparatively short time, are usually rather complex in construction, and also have the particular disadvantage that there is no disposition for holding positive prints produced by the cameras. This results in a conventional auto-process camera being generally difficult of manipulation, since, after a shot is taken, and the exposed monosheet is processed and extruded from the camera, the photographer must transfer the processed monosheet to a separate bag or container, it frequently being necessary to wait for the processed monosheet to dry before transfer thereof to a separate container. This procedure is obviously inconvenient when it is wished to take a number of shots in rapid succession, particularly if the photographer is outdoors, and an auto-process camera with a provision for automatic accommodation for processed monosheets has been required for a long time. A principal problem associated with providing such monosheet accommodation on a camera itself, is that, because of their characteristics, monosheets cannot be bent more than a certain degree without damage thereto, and there has hitherto been no real progress made to improve auto-process cameras in this respect.

It is accordingly an object of the present invention to provide an auto-process camera comprising accommodation into which processed monosheets are automatically transferred, and bent through a very slight angle only during this transfer.

It is another object of the invention to provide an auto-process camera which permits shots to be taken in comparatively rapid succession.

It is another object of the invention to provide an auto-process camera which comprises accommodation for exposed monosheets, but which is simple and compact in construction.

In accomplishing these and other objects, there is provided, according to the present invention, an auto-process camera which comprises a pocket for containing exposed monosheets, means for actuating drive means provided in a film cassette containing monosheets and loaded in the camera, and means for transferring exposed monosheet from a cassette to the monosheet pocket. The monosheet pocket is provided at the rear of the camera, and unexposed monosheets are loaded in the camera with the leading ends thereof, that is, the sacs containing processing solution, upwards. After exposure of a monosheet, the monosheet is moved upwards out of its film-cassette, through press rolls, for processing thereof, through an opening formed in the camera top, whereby the upper portion of the monosheet projects above the camera, while the lower portion thereof still remains in the camera, and the monosheet is then moved downwards, at a different angle, into the pocket for exposed monosheets, from which it may be removed later, when required, by the photographer. The whole process is automatic, the only action required of a photographer being that he or she actuate the camera release button in a normal manner.

These and other objects and features of the present invention will become apparent from the following description taken by way of example with reference to the accompanying drawings, in which:

FIG. 8 is a central side sectional view taken along a line VIII—VIII of FIG. 5, FIGS. 9, 10, and 11 are separatively enlarged perspective views of main parts in the camera shown in FIG. 1, FIG. 12 (a-f) is an explanatory drawing illustrating transfer of a monosheet from a film cassette to a pocket of the camera of FIG. 1.

Before proceeding with the description, it is to be noted that like numbers refer to like parts. Also, for the purposes of the description, terms such as upper, lower, forwards, rearwards, left, right, are to be taken as being in reference to a normally upright, forward-pointing auto-process camera, or film-cassette contained therein.

Figure 1:
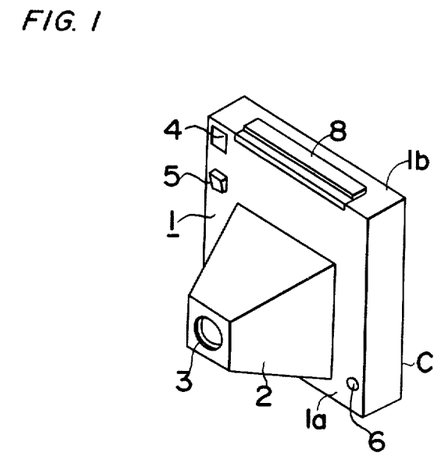
FIG. 1 is a front perspective view of an auto-process camera according to one embodiment of the invention.

Reference is made initially to FIGS. 1 through 4, which show the general external appearance of an auto-process camera C of the invention. In FIG. 1, the camera C comprises a main body 1, a lens mount portion 2, in which there is mounted a lens 3 and which projects forwards from the camera front 1a, a viewfinder 4, a shutter release button 5, and a monosheet recharge button 6, which is provided in a lower left-hand portion of the camera front 1a, and whose function is described further below.

Figure 2:
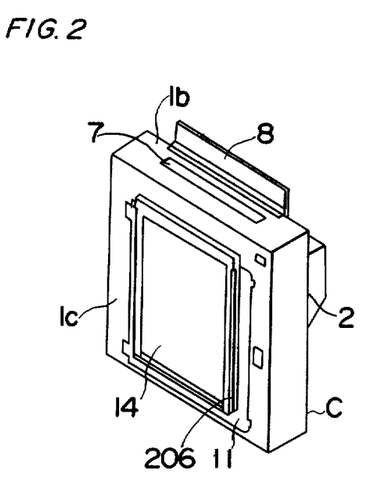
FIG. 2 is a rear perspective view of the embodiment of the camera of FIG. 1.
Figure 3:
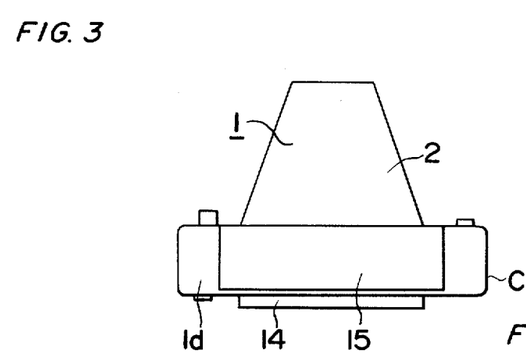
FIG. 3 is a bottom view of the camera of FIG. 1.
Figure 4:
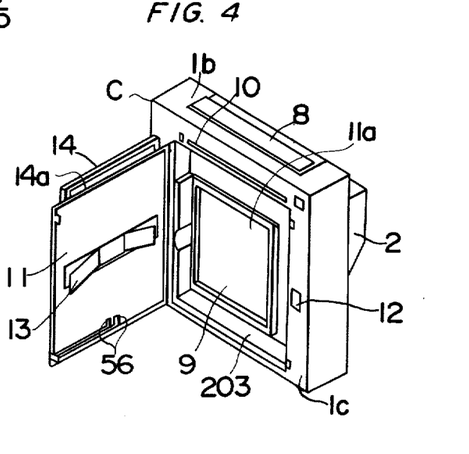
FIG. 4 is a rear view of the camera of FIG. 1 showing a rear cover opened.

In FIGS. 2, 4, an opening 7 is formed in the camera top 1b. The opening 7 is formed generally parallel to the long axis of the camera top 1b, that is, generally parallel to the camera front 1a, and is normally covered, and protected from dust and moisture by a cover 8. The opening 7 permits an exposed monosheet 68 to temporarily protrude from the camera top 1b, as described in further detail below. In the camera rear 1c there is formed a large opening 11a which is normally sealed by a click-to rear cover 11. The rear cover 11 may be opened by depression of a button 12 provided on the camera rear 1c to the right of the opening 11a. The opening 11a communicates with a mounting portion 9, which is complementary in shape to the front and sides of a film cassette CA containing monosheets 6 and employed in association with the auto-process camera C, thereby a film cassette CA may be loaded into the camera C. The lower part of the mounting portion 9 communicates with a recharge opening 203, which may accommodate a recharge cassette CA', and which is normally sealed by a cover 15 on the camera bottom 1d (FIG. 3). In the camera rear 1c there is also formed a transfer slit 10, which is slightly above, and parallel to the top of the rear opening 11a. The rear cover 11 covers the rear opening 11a, but does not cover the transfer slit 10. A film cassette CA is loaded into the camera C simply by depressing the button 12, to open the rear cover 11, inserting the cassette CA through the opening 11a and into the mounting portion 9, and then reclosing the rear cover 11.

Still referring to FIGS. 2, 4, a pocket 14 is fixedly attached to the rear side of the cover 11. The pocket 14 is of suitable dimensions to hold a required number of processed monosheets, and also comprises an upper portion which projects higher than the top of the rear cover 11, and constitutes a pocket opening 14a. When the rear cover 11 is closed, the pocket opening 14a fits over the transfer slit 10. As described in further detail below, after exposure, a monosheet 68 is moved upwards from the cassette CA, through processing rolls provided in the upper part of the camera C, upwards, to project out of the opening 7 in the camera top 1b, and then downwards through the opening 7, through the transfer slit 10, through the pocket opening 14a, and into the pocket 14. The back of the pocket 14 is transparent, to permit successive photographs obtained to be viewed. At the side of the pocket 14, there is formed a removal slit 206, through which processed monosheets 68 contained in the pocket 14 may be subsequently removed by the photographer.

Figure 5:
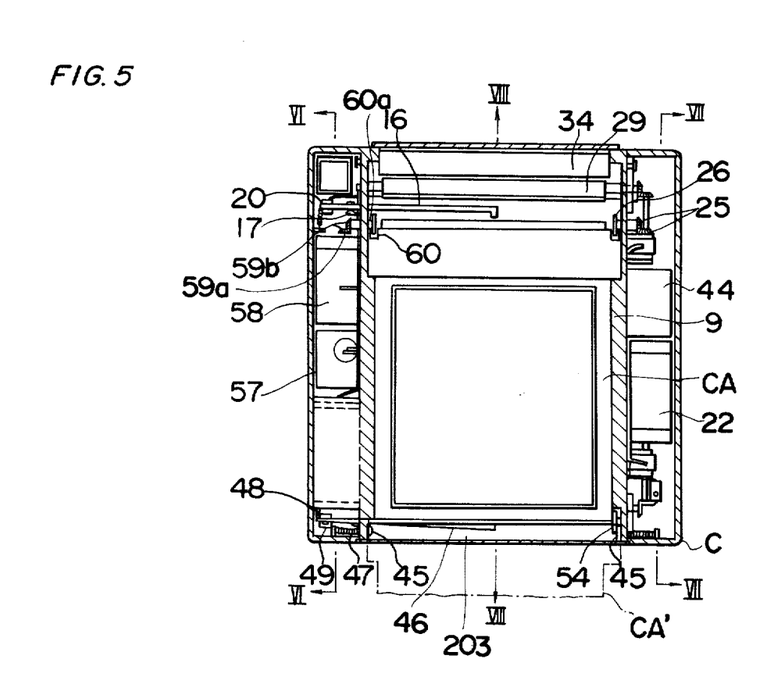
FIG. 5 is a front sectional view of the camera of FIG. 1.

In a generally central portion of the front side of the rear cover 11 there is provided a spring, or springs, 13, which exerts a forwards pressure to hold a loaded cassette CA directly in place when the cover 11 is closed. At a lower part of the front side of the cover 11 there are provided contacts 56, which connect to contact terminals 96 provided on the cassette CA, when the cover 11 is closed, and which always connect to a control box 57 controlling a motor 58 (FIG. 5).

Before the description of the camera C of the invention proceeds, a film cassette CA useable in association with the camera C will be described briefly, in reference to FIGS. 13 to 18.

Figure 14:
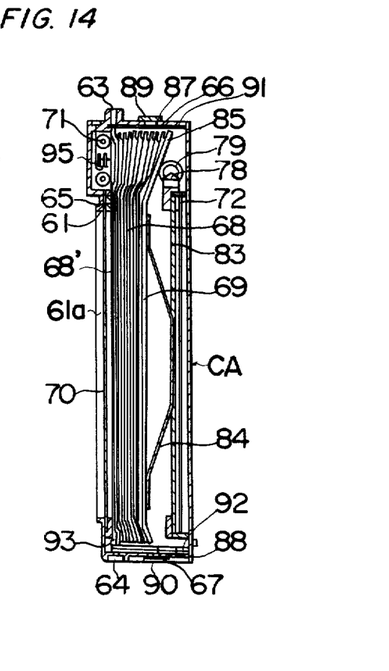
FIG. 14 is a cross sectional view taken along a line XIV—XIV of FIG. 13.
Figure 15:
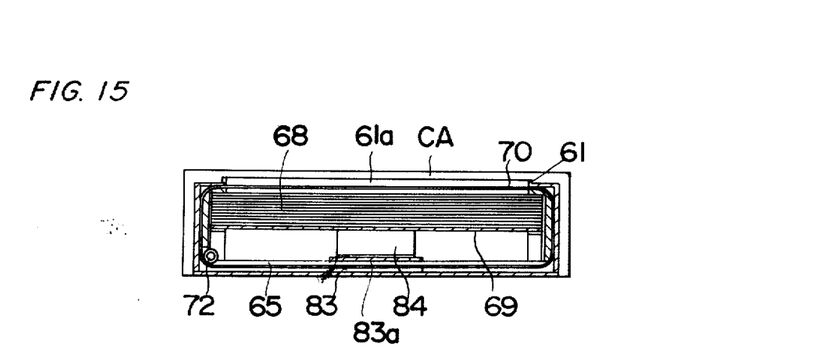
FIG. 15 is a cross-sectional view taken along a line XV—XV of FIG. 13.
Figure 16:
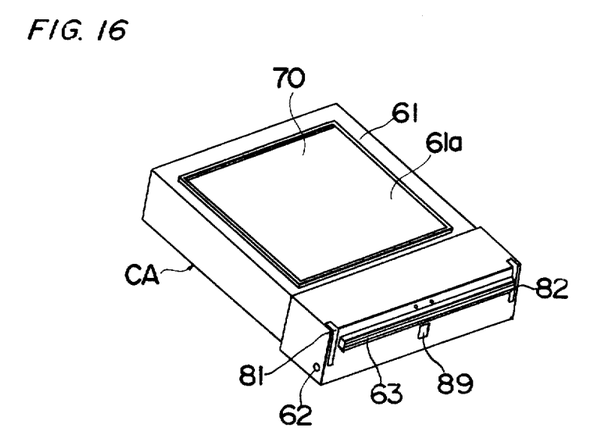
FIG. 16 is a perspective view of the film cassette of FIG. 13, and FIGS. 17, 18 are perspective views of main parts of the film cassette of FIG. 13.

The film cassette CA comprises an outer protective case 61, a frame 65, and a light-proof sheet 70. Monosheets 68 are held within the frame 65, the light-proof sheet 70 passes around the frame 65 and monosheets 68, and this assembly is contained in the case 61(FIG. 15). In FIGS. 14, 16, the case 61 comprises a front exposure opening 61a through which a foremost monosheet 68 in the cassette CA may be exposed, a protrudent extraction outlet 63, which is formed at the top of the case 61, and a recessed recharge inlet 64, which is formed at the bottom of the case 61, in line with the extraction outlet 63, and is complementary in shape to the extraction outlet 63, whereby the extraction outlet 63' of one recharge cassette CA' may fit into the recharge inlet 64 of another loaded cassette CA. The extraction outlet 63 and recharge inlet 64 are normally sealed by spring-loaded covers 66, 67, respectively. The covers 66, 67 are connected respectively to actuation pieces 89, 90, which lie on the outside surface of the case 61, at the top and bottom thereof, respectively. The actuation pieces 89, 90 respectively may be contacted and moved rearwards by levers 16, 46 provided in the camera C, whereby the covers 66, 67 may be moved rearwards to open the extraction outlet 63 and recharge inlet 64. Near the extraction outlet 63 there are provided contacts 95 which detect the transfer of a monosheet 68 when the cassette CA is used as a recharge cassette, and accordingly supply signals to a control box 44. Near the upper ends of the left- and right-hand sides of the case 61, there are formed holes 62, which are engaged by pins 45 in the camera C, when the cassette CA is used as a recharge cassette CA'. The cassette CA is loaded into the camera C with the extraction outlet 63 thereof uppermost, adjacent to the camera top 1b, and the recharge inlet 64 lowermost, adjacent to the camera bottom 1d.

Figures 17, 18:
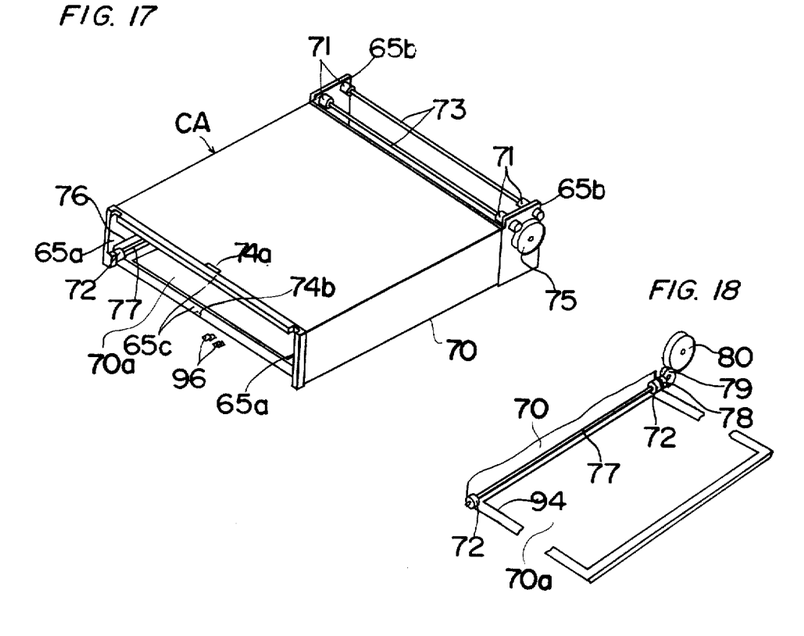

Prior to loading of the cassette CA into the camera C, or during temporary unloading therefrom, the monosheets 68 are protected from exposure to light by the abovementioned light-proof sheet 70, which is tautly mounted on and around a frame 65. Referring now to FIG. 17, the frame 65 may be seen to comprise left-hand and right-hand side walls 65a which are generally rectangular and parallel to one another, two connection strips 65c, one of which provides rigid connection between the top front corners of the side walls 65a, and the other of which provides rigid connection between the top rear corners thereof, and two connection strips 65c, which similarly connect the front and rear bottom corners of the side walls 65a. The side walls 65a, and connection strips 65c thus form the frame of a generally flat rectangular box which is open at the front, rear, top and bottom. The dimensions of the front and of the rear of this box are generally equal to the large dimensions of the negative film portion and wiper board, of a monosheet 68, and the thickness thereof, that is, the width of the side walls 65a, is slightly greater than the combined thickness of monosheets 68 packed in the cassette CA. The frame 65 fits without play in the case 61, and is protected thereby. Monosheets 68 contained in the cassette CA lie within the frame 65, the sacs thereof extending upwards above the frame 65, into the upper portion of the case 61, as shown most clearly in FIG. 14. The frame 65 further comprises roller mounting boards 65b, which are fixedly attached to the tops of the side walls 65a, respectively and extend upwards therefrom and generally in line therewith.

The width of the light-proof sheet 70 is generally equal to the length of the side walls 65a, and the sheet 70 extends from the connection strips 65c to the connection strips 65c, and is stretched around the frame 65, that is, the light-proof sheet 70 lies between the frame 65 and the case 61. As mentioned earlier the sheet 70 also passes through the slit 83a of the base portion 83. In other words the spring 84 and pressure plate 69 also lie within the light-proof sheet 70, as shown most clearly in FIG. 15.

Monosheets 68 are packed in the cassette CA with the chemical solution containers thereof, that is, the leading ends thereof, uppermost, and are pressed towards the front of the cassette CA by a spring 84 acting through a pressure plate 69, whereby the foremost monosheet 68 is in line with the extraction outlet 63 and recharge inlet 64, and the negative film portion thereof is framed in the exposure opening 61a of the case 61, as shown most clearly in FIG. 14. In the upper part of the cassette CA, and in contact with a foremost monosheet 68, there are provided friction rollers 71, which are mounted on a shaft 73 of the frame 65.

Figure 13:
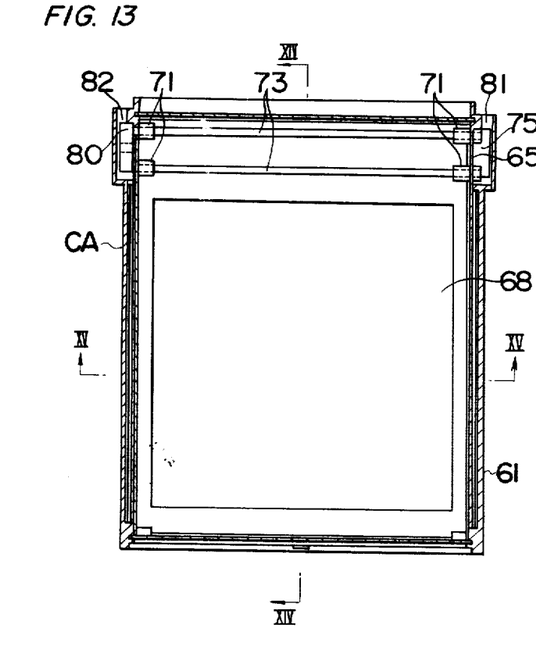
FIG. 13 is a front sectional view of the film cassette of FIG. 12.

The friction rollers 71 are rotated by rotation of a transmission roller 75, to which the friction rollers 71 are connected, and which lies on the outside of the frame 65 (FIGS. 13, 17). The transmission roller 75 lies adjacent to and in line with a slit 81, which is formed near the upper, front left-hand corner of the case 61, and through which the roller 75 is contacted and driven by a drive roller 26 or 54 provided in the camera C, drive being provided by the drive roller 26 when the cassette CA is loaded in the camera C, and by the drive roller 54 when the cassette CA'. In either case, upon rotation of the friction rollers 71, a foremost monosheet 68 is drawn upwards, and through the extraction outlet 63.

The light-proof sheet 70 comprises an opening 70a equal in dimensions to the exposure opening 61a of the case 61, and is contacted by friction rollers 72, which are mounted on a shaft 77 of the frame 65, and connect to a transmission roller 80 (FIG. 17, 18). The transmission roller 80 lies adjacent to and in line with a slit 82, which is formed near the upper, front right-hand corner of the case 61, and through which the roller 80 may be contacted and driven by a drive roller 60 provided in the camera C, and rotated by the abovementioned motor 58. The light-proof sheet 70 may be driven to a position to cover the exposure opening 61a, or to a position to uncover the exposure opening 61a. The motor 58 is actuated, and drive from the drive roller 60 is supplied, when the camera rear cover is opened or closed and contact is broken or made between the abovementioned contacts 56 on the rear cover 11 and contact terminals 96 provided on the cassette CA. The motor 58 is stopped when either of two detection foils 74a, 74b which are provided on opposite portions of the bottom edge of the light-proof sheet 70, with contact terminals 96 provided in the cassette CA. This contact between detection foils 74 and terminals 96 is made when the light-proof sheet 70 is moved to a position to completely cover, or completely uncover the exposure opening 61a.

Control to actuate or stop the motor 58 may be effected in any conventionally known manner. For example, in one embodiment of the invention, the control box 57 comprises an R-S flip-flop FF1 which controls electrical supply to drive the motor 58, the motor 58 being driven when the R-S flip-flop conducts, and being stopped when the R-S flip-flop does not conduct. Input to the setting terminal S of the flip-flop FF1 is supplied from either a circuit A1 or a circuit A2. Circuit A1 is actuated to supply input when contact between the terminals 96 and contacts 56 is broken, that is, when the cover 11 is opened. Circuit A2 is actuated to supply input when contact between the terminals 96 and contacts 56 is established, that is, when the cover 11 is closed. Input to the reset terminal R of the flip-flop FF1 is supplied upon contact of either of the detection foils 74 with the terminals 96.

Referring back to FIGS. 5, 6 the control box 57 and motor 58 are provided in a right-hand portion of the camera C. Drive from the motor 58 rotates a horizontally aligned bevel gear 59a, which is provided above the motor 58. The bevel gear 59a engages and rotates a vertically aligned bevel gear 59b. The bevel gear 59b is fixedly mounted on a horizontal shaft 60a, which is rotatably mounted in a fixed portion of the interior of the camera C, and on which there is also fixedly mounted a vertically aligned drive roller 60. When a cassette CA is loaded in the camera C, the drive roller 60 projects slightly into the slit 82 of the cassette CA (FIG. 16), and to engage the transmission roller 80 provided in the cassette CA (FIG. 18), and rotate the light-proof sheet 70, as described above.

Figure 6:
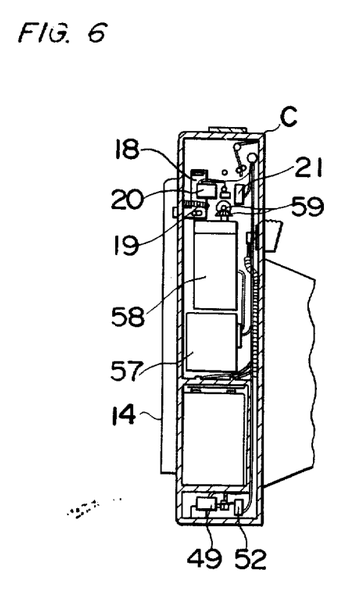
FIG. 6 is a left side sectional view taken along a line IV—IV of FIG. 5.
Figures 8, 9, 10, 11:
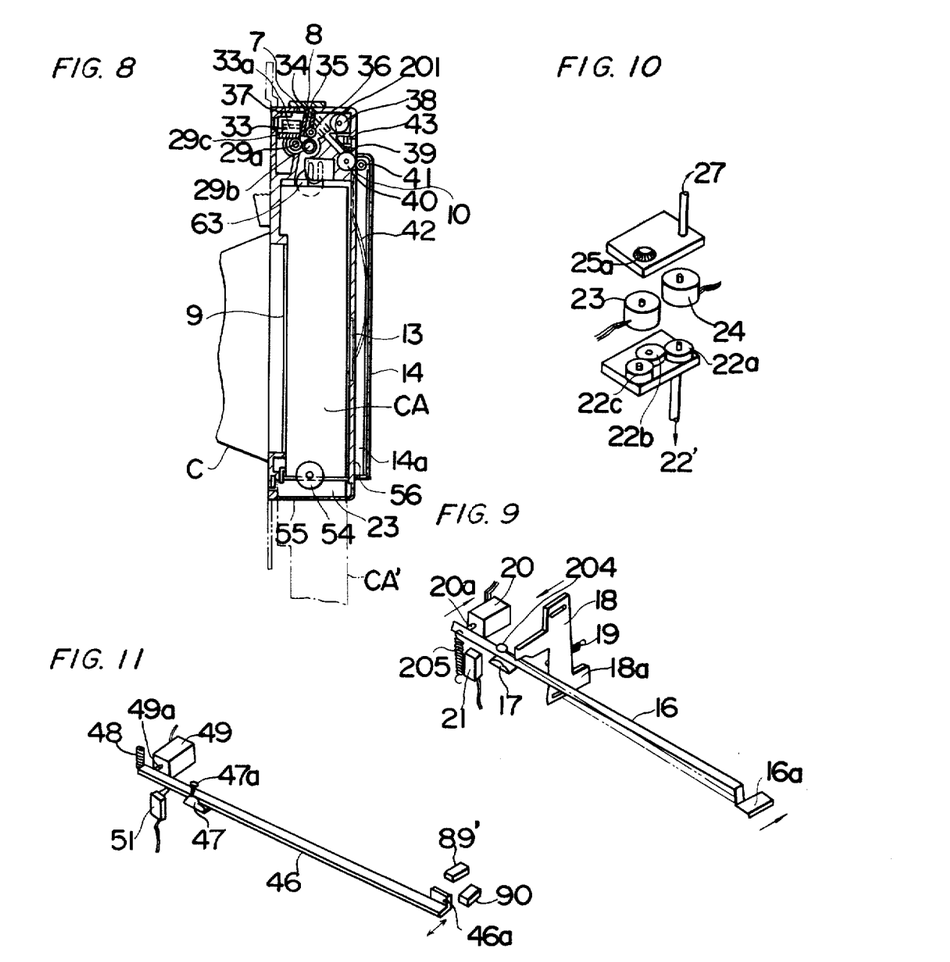

Still referring to FIGS. 5, 6, and also to FIG. 9, the abovementioned lever 16 extends from an upper right-hand portion of the camera C to a point which is above the mounting portion 9, and generally in line with the centre thereof. The lever 16 is pivotally and rotatably mounted on a pin 204, which is fixedly attached to a small support plate 17. The support plate 17 is attached to a fixed portion of the camera C. One end of a compression spring 205 is attached to the right-hand end of the lever 16, the other end of the spring 205 being attached to a fixed part of the camera C below the lever 16, whereby the spring 205 exerts a continuous force urging the right-hand end of the lever 16 downwards. At a point to the left of the pivot pin 204, the lever 16 is contactable by a push plate 18. The push plate 18 is in a generally vertical alignment and the lower edge thereof, which contacts the lever 16, is sloped downwards, whereby the front portion of the push-plate 18 is narrower than the rear thereof. The rear edge of the push-plate 18 is fixedly attached to, or integrally formed with a vertical support plate 18a. The top and bottom portions of the support plate 18a are slidably supported in fixed portions of the camera C. The vertical support plate 18a is attached by a spring 19 to the camera rear cover 11. When the rear cover 11 is opened, the spring 19 pulls the support plate 18a and push-plate 18 rearwards to a position in which only the forward end of the push-plate 18 may contact the lever 16, and the spring 205 may therefore pull the right-hand end of the lever 16 downwards, whereby the left-hand portion of the lever 16 is raised, and does not hinder loading or removal of a cassette CA into or from the camera C. When the camera rear cover 11 is closed, the push-plate 18 is pushed forwards, and the lower edge thereof rides on the lever 16 and gradually pushes the left-hand portion of the lever 16 downwards, to a position in which a contact portion 16a formed at the extreme left-hand end of the lever 16 contacts the front of the abovementioned actuation piece 89 connected to the cover 66 of the extraction outlet 63 of the cassette CA (FIG. 14). The right-hand end of the lever 16 is also connected to the outer end of a plunger 20a associated with a solenoid 20. Upon actuation of the camera shutter release mechanism, the solenoid 20 and plunger 20a assembly is actuated to pivot the lever 16 and push the right hand end thereof forwards, whereupon the lever contact portion 16a pushes the actuation piece 89 rearwards, therby opening the cassette extraction outlet 63. At the same time the front edge of the right-hand portion of the lever 16 pushes, and closes a main switch 21, which connects to, and, when closed, permits operation of a control box 44.

Figure 7:
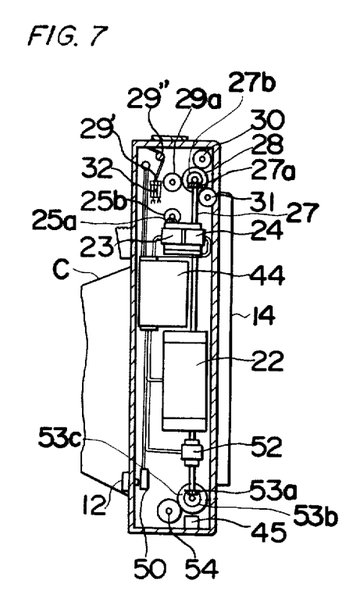
FIG. 7 is a right side sectional view taken along a line VII—VII of FIG. 5.

Referring to FIGS. 5, 7, 10, the control box 44 is provided in a left-hand portion of the camera C, FIG. 5 and controls actuation of a motor 22, which is similarly provided in a left-hand portion of the camera C, adjacent to the control box 44. Drive from the motor 22 is supplied through clutches 23, 24, and 52 to the abovementioned drive roller 26, a main roller 28, and the abovementioned drive roller 54 respectively.

When the camera shutter release mechanism is actuated, the motor 22 is also actuated, and at the same time the clutches 23, 24 are caused to engage. As shown in FIG. 10, the clutch 24 couples the motor 22 drive shaft directly to a vertically aligned shaft 27. In FIG. 7, a horizontally aligned bevel gear 27a is fixedly mounted on the upper end of the shaft 27, and engages and drives a vertically aligned bevel gear 27b, which is fixedly mounted on the same shaft as, or integrally formed with, the main roller 28. The function of the main roller 28 will be described further below.

A gear wheel 22a is fixedly mounted on the upper end of the drive shaft of the motor 22, and engages and drives an idle gear 22b, which engages and drives a gear wheel 22c (FIG. 10). Engagement of the clutch 23 couples the rotatory shaft of the gear wheel 22c to that of a horizontally aligned bevel gear 25a provided above the gear wheel 22c. The bevel gear 25a engages and drives a vertically aligned bevel gear 25b, which is fixedly mounted on the same shaft as, or integrally formed with, the drive roller 26. The drive roller 26 is vertically aligned and, as described above, projects slightly into the slit 81 of the cassette CA, and contacts and drives the transmission roller 75 provided in the cassette CA, to rotate the friction rollers 71 provided in the cassette CA, and withdraw a foremost monosheet 68 from the cassette CA (FIG. 13).

In FIGS. 5, 7, the clutch 52 couples drive from the motor 22 to a horizontally aligned bevel gear 53a, which engages and drives a vertically aligned bevel gear 53b. The bevel gear 53b is coaxial with, and fixedly attached to, or integrally formed with, a roll 53c. The roll 53c contacts and rotates the drive roller 54, which may contact and drive the transmission roller 75' of a recharge cassette CA', to rotate the friction rollers 12' thereof, and withdraw foremost monosheet 68' therefrom as described above.

To supply supplementary monosheets 68' of the recharge cassette CA' into a cassette CA which is already loaded in the camera C, the recharge opening cover 15 of the camera C is opened, and a recharge cassette CA' containing supplementary monosheets 68' is inserted into the recharge opening 203 (FIGS. 3, 4, 5). In this configuration, the holes 62' formed near the tops of the left- and right-hand sides of the cassette CA' are engaged by the abovementioned spring-loaded pins 45, which are provided on the left- and right-hand sides of the recharge opening 203, as indicated in FIG. 5, the recharge cassette CA' thus being held without support by a photographer. Also in this configuration, the extraction outlet 63' of the recharge cassette CA' fits into the recharge inlet 64 of the loaded cassette CA, and a contact portion 46a formed at the left-hand end of the abovementioned lever 46 contacts the fronts of the actuation pieces 89', 90, which are connected, respectively, to the extraction outlet cover 66' of the recharge cassette CA', and to the recharge inlet cover 67 of the loaded cassette CA (FIG. 14). The motor 22 is actuated and the clutch 52 is engaged upon closure of a control switch 51 by the lever 46.

Referring now mainly to FIGS. 5, 11, and also to FIG. 6, the lever 46 extends from a lower right-hand portion of the camera C to approximately the centre of the recharge opening 203, and is pivotally and rotatably mounted on a pin 47a which is fixedly attached to a small support plate 47. The support plate 47 is attached to a fixed part of the camera C. One end of a spring 48 is attached to the right-hand end of the lever 46, the other end of the spring 48 being attached to a fixed portion of the camera C higher than the lever 46. The spring 48 exerts a continuous force to pull the right-hand end of the lever 46 upwards, whereby the left-hand portion of the lever 46 is moved downwards, and does not hinder loading or removal of a cassette CA into or from the camera C. When a recharge cassette CA' is mounted in the recharge opening 203, the left-hand end of the lever 46 is pushed upwards, counter to the force of the spring 48, and the lever 46 is brought to a generally level position, the contact portion 46 a at the left-hand end thereof contacting the actuation pieces 89', 90 of the recharge and loaded cassettes CA', CA.

The right-hand end of the lever 46 is also connected to a plunger 49a associated with a solenoid 49. Upon depression of the recharge button 6 (FIG. 1), the solenoid 49 and plunger 49a assembly is actuated to push the right-hand end of the lever 46 forwards. The front edge of the right-hand portion of the lever 46 hereupon closes the switch 51, thus causing engagement of the clutch 52 and actuation of the motor 22, and at the same time the contact portion 46a pushes the actuation pieces 89', 90 rearwards, thereby opening the extraction outlet 63' of the recharge cassette CA', and the recharge inlet 64 of the loaded cassette CA. The recharge cassette friction rolls 71' are driven, and a foremost supplementary monosheet 68' is transferred through the recharge cassette extraction outlet 63' and the loaded cassette recharge inlet 64, into a foremost position in the loaded cassette CA. When the leading end of this supplementary monosheet 68' reaches the friction rollers 71 of the loaded cassette CA, the control box 44 causes the clutch 52 to disengage and the clutch 23 to engage, while the motor 22 continues to be actuated. Rotation of the recharge cassette friction rollers 71' therefore ceases, and the loaded cassette friction rollers 71 are rotated. After engagement of the clutch 23, the motor 22 continues to be actuated only for sufficient time to allow the loaded cassette friction rollers 71 to draw the supplementary monosheet 68' completely into the loaded cassette CA. At the same time, the solenoid 49 and plunger 49a assembly moves the right-hand end of the lever 46 rearwards, whereby the contact portion 46a is moved forwards, and the spring-loaded covers 66', 67 are unopposed to move forwards and close the recharge cassette extraction outlet 63' and the loaded cassette recharge inlet 64. Supply of another supplementary monosheet 68' into the loaded cassette CA is effected by again depressing the recharge button 6. Control of this action for recharging a loaded cassette CA with supplementary monosheets 68' may be effected in any conventionally known manner. In one embodiment of the invention, the abovementioned contacts near the extraction outlet are closed when a monosheet 68' begins to move out of the recharge cassette CA', and this closure of the contacts actuates two delay circuits, one of which causes the disengagement of the clutch 52 and engagement of the clutch 23, when the monosheet 68' has had time to reach the loaded cassette rollers 71, and the other of which stops the motor 22 and disengages the clutch 23, when the monosheet 68' has had time to be completely drawn into the loaded cassette CA.

The description will continue below in reference to the function of the main roller 28 and to the transfer of an exposed monosheet 68 from the loaded cassette CA to the pocket 14.

Referring to FIGs. 5, 7, the main roller 28 contacts one end of, and drives a processing press roll 29a, and also contacts and drives follower rolls 30, 31. The processing press roll 29a is associated with another processing press roll 29b, which is normally held in contact with the press roll 29a by a spring 29c attached to the inside of the camera C. The press rolls 29a, 29b are in a left to right alignment in the upper part of the camera C, and the line of junction thereof is in line with the extraction outlet 63 of the cassette CA. An exposed monosheet 68 coming from the extraction outlet 63 is passed between the press rolls 29a, 29b, which cause the processing solution in the container portion at the leading end of the monosheet 68 to be extruded onto the negative film portion thereof, to produce a positive print in a conventionally known manner. Above the press rolls 29a, 29b there is provided a pivotable guide block 34, which leads a processed monosheet 68 to the opening 7 formed in the camera top 1b, as described in further detail below. In FIG. 7, the follower roll 30 is provided in a top rear corner portion of the camera C, and the follower roll 31 is provided slightly to the rear of the main roller 28 and in line with the abovementioned transfer slit 10 formed above the camera rear opening 11a.

Referring now to FIG. 8, a roller 38, which is provided in a generally central part of the upper portion of the camera C, is fixedly mounted on the same rotatory shaft as the follower roll 30, and is thus rotated when the follower roll 30 is driven by the main roller 28. The roller 38 serves to engage and drive a friction roller 36 associated with the guide block 34, as described below. A roller 40 is fixedly mounted on the same shaft as, or integrally formed with, the follower roll 31. The roller 40 extends to the left-hand end of the opening 14a of the pocket 14, and contacts and drives a feed roll 41, which is provided in the upper part of the pocket 14, at the opening 14a. The feed roll 40 serves to feed processed monosheets 68 into the pocket 14, and is of sufficient length to apply a generally even pressure on a monosheet 68. Processed monosheets 68 fed into the pocket 14 are urged towards the transparent rear wall of the pocket 14 by a spring 42 attached to the front wall of the pocket 14, and each successive processed monosheet 68 fed into the pocket 14 is guided into a rearmost position whereby the image formed thereon may be viewed through the rear wall of the pocket 14.

In FIGS. 7, 8, passage of a monosheet 68 through the press rolls 29a, 29b causes the press roll 29b to move forward, against the force of the spring 29c, and close a switch 32. Acting through the control box 44, closure of the switch 32 causes the abovementioned clutch 23 to disengage, and also supplies a control signal for actuation of a solenoid 33 and plunger 33a assembly, which is associated with the guide block 34.

Figure 12:
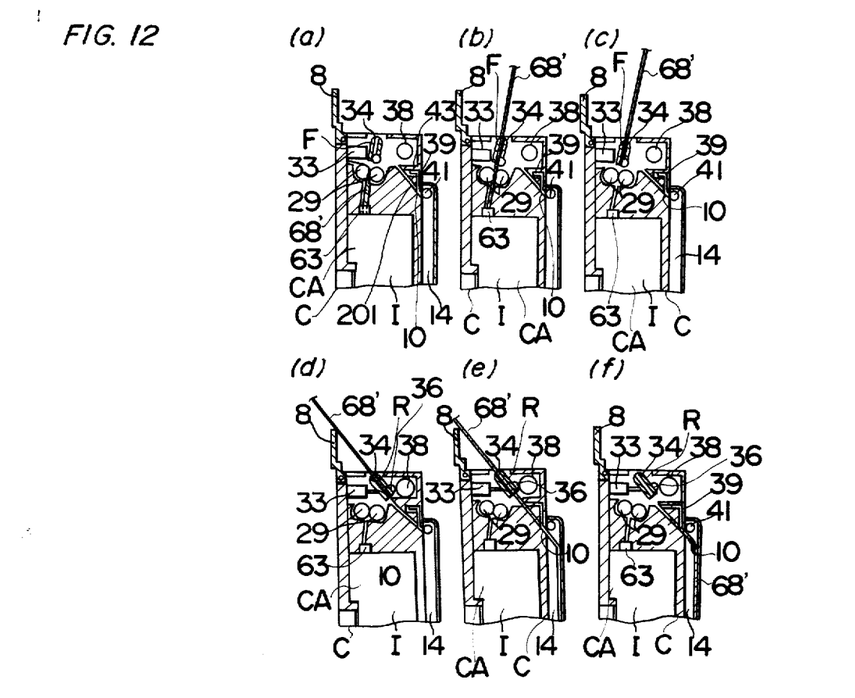

Still referring to FIG. 8, and also referring to FIG. 12, the guide block 34 comprises a passage 35 extending completely therethrough, and is in pivotal attachment to the top of the camera C. At the lower end of the rear side of the guide block 34 there is provided a rotatably mounted friction roller 36, which is in a left to right alignment, is generally equal in length to the guide block 34, and projects into the passage 35. The position of the guide block 34 is determined by actuation of the solenoid 33 and plunger 33a assembly, and may be one of two positions, which are a forward position F and a rearward position R. When the guide block 34 is in the forward position F, the lower end thereof is forwardly inclined, and the passage 35 provides communication between the line of junction of the press rolls 29a, 29b and the opening 7 formed in the camera top 1b. When the guide block 34 is in the rearward position R, the lower end thereof is rearwardly inclined, the friction roller 36 is brought into contact with the roller 38, and the passage 35 provides communication between the opening 7 and a downwardly inclined chute 201 which leads to the transfer slit 10. The guide block 34 is normally in the forward position F, and the solenoid 33 and plunger 33a assembly is actuated to move the guide block 34 to the rearward position R after a certain delay after closure of the switch 32 due to passage of an exposed monosheet between the press rolls 29a, 29b.

At a point on the inside surface of the camera rear wall 1c, adjacent to the transfer slit 10, there is provided a pivotally mounted contact plate 39 which normally provides electrical connection between terminals 43 (FIG. 8). When a processed monosheet 68 is passed through the transfer slit 10, the contact plate 39 is pushed by the monosheet 68, and pivoted to a position in which electrical contact between the terminals 43 is broken. Breaking of contact between the terminals 43 actuates a delay circuit, or similar means in the control box 44, which, after a delay sufficient to allow the monosheet 68 to be fed completely into the pocket 14, causes the motor 22 to stop running, the clutch 24 to disengage, the solenoid 33 and plunger 33a assembly to move the guide block 34 to the forward position F, and the solenoid 20 and plunger 20a assembly to move the right-hand end of the lever 16 rearwards. Transfer of a monosheet 68 from the cassette CA to the pocket 14 requires that the cover 8 of the opening 7 be opened to the position indicated in the chain-dot line portion of FIG. 8, to permit the monosheet 68 to project temporarily from the camera top 1b. As a safety precaution to ensure that there is no jamming or stoppage of exposed monosheets 68 due to inadvertent depression of the shutter release button 5 by a photographer when the cover 8 is closed, there is provided a switch 37, which is actuated one when the cover 8 is open, and controls actuation of the camera shutter release mechanism and the control box 44 whereby monosheets 68 in the cassette CA cannot be exposed or the control box 44 actuated unless cover 8 is open.

Resuming the action of the abovedescribed means, if the cover 8 is open, upon depression of the shutter release button 5, a foremost monosheet 68' in the cassette CA is exposed, and at the same time the lever 16 is pivoted to close the main switch 21 and to open the extraction outlet 63 of the cassette CA (FIGS. 5, 9), the motor 22 is actuated and the clutches 23, 24 are engaged (FIG. 7), drive from the motor 22 being therefore supplied simultaneously to the drive roller 26 and to the main roller 28. The drive roller 26 drives the transmission roller 75, whereby the friction rollers 71 of the cassette CA are rotated, and the monosheet 68' is drawn upwards to, and through the extraction outlet 63 (FIGS. 13, 14). Simultaneously rotation of the main roller 28 causes rotation of the press rolls 29a, 29b, the follower roll 30 and roll 38, and the follower roll 31, roll 40, and feed roll 41 (FIGS. 7, 8). The friction roller 36 associated with the guide block 34 is not rotating at this time.

Continuing now mainly in reference to FIG. 12, as the friction rollers 12 continue to rotate, the monosheet 68' is moved further upwards, and the leading end thereof is brought to the press rolls 29a, 29b (FIG. 12a). The press rolls 29a, 29b, while processing the monosheet 68', draw the monosheet 68' upwards, through the passage 35 of the guide block 34 to, and through the opening 7 (FIG. 12b). At this time the friction roller 36 exerts sufficient pressure to prevent downward slippage of the monosheet 68', as a greater and greater proportion of the monosheet 68' is moved to above the press rolls 29a, 29b. At the monosheet 68' passes between the press rolls 29a, 29b the switch 32 is closed and the clutch 24 is disengaged, as described earlier. Drive to the friction rollers 71 therefore ceases, and upward movement of the monosheet 68' is effected by the press rolls 29a, 29b only. Since the friction rollers 71 stop rotating, only the exposed monosheet 68' is removed from the cassette CA, and any remaining monosheets 68 are simply moved forwards inside the cassette CA, in readiness for subsequent exposures.

After an elapse of sufficient time to permit the monosheet 68' to be moved completely past and above the press rolls 29a, 29b, to a position in which the greater portion of the monosheet 68' projects above the camera top 1b, the lower end portion thereof remaining in the guide block passage 35, as indicted in FIG. 12c, a timed control circuit, or similar means, which is provided in the control box 44, and is initially actuated upon closure of the switch 32, causes the solenoid 33 and plunger 33a assembly to push the guide block 34 to the rearward position R, the monosheet 68' being pivoted together with the guide block 34, as indicated in FIG. 12d. Contact between the friction roller 36 and the roll 38 now causes the friction roller to rotate, whereupon the monosheet 68' is drawn downwards by the friction roller 36, through the guide block passage 35, along the chute 201, through the transfer slit 10, into the pocket opening 14a, and into contact with the feed roll 41 (FIG. 12e), the contact plate 39 being simultaneously moved out of contact with the terminals 43, and a control signal being supplied to the control box 44. The angle of the chute 201 relative to the pocket 14 is such that monosheets 68 are guided to a rearmost position in the pocket 14. The feed roll 41 moves the monosheet 68' into the pocket 14, even when the monosheet 68' has moved completely out of contact with the friction roller 36 (FIG. 12f). As described above, after sufficient time to permit complete insertion of the monosheet 68' into the pocket 14, the guide block 34 is moved to the forward position F, the lever 16 is pivoted to allow the cover 66 of the cassette CA to close the extraction outlet 63, and to open the main switch 21, the motor 22 stops and the clutch 23 is disengaged. In other words, the camera C and cassette CA are now ready for recharging of supplementary monosheets 68' into the cassette CA or for exposure of a subsequent foremost monosheet 68 in the cassette CA, and transfer therefrom to the pocket 14.

As is clear from the avove description, the present invention provides a simply construced, compact autoprocess camera comprising an integrally formed accommodation means into which exposed and processed monosheets are automatically supplied, this transfer to the accommodation means being accompanied by no more bending of the monosheets than that to which monosheets might be subjected during normal handling thereof. An incidental advantage of the auto-process camera of the invention is that processed monosheets are extruded from the top of the camera, and, considering the fact that most photographers hold a camera at the sides thereof, there is little risk of a photographer inadvertently blocking the exit for processed monosheets, as is liable with conventional auto-process cameras, which generally comprise an exit for processed monosheets at the side. A main advantage of the auto-process camera of the invention is that a photographer need be concerned only with taking photographs in a desired manner and does not have to be concerned with simultaneously trying to handle a camera and processed monosheets extruded from the camera. The camera of the invention therefore permits a photographer take shots in more rapid succession and to concentrate more one photographic techniques. The invention thus offers considerable advantages in the exercice of photographic art.

Although the present invention has been fully described by way of the preferred embodiments thereof with reference to the accompanying drawings, it is to be noted that various changes and modifications are apparent to those skilled in the art. Therefore, unless otherwise such changes and modifications depart from the true scope of the present invention, they should be construed as included therein.

What is claimed is:

1. An auto-process camera comprising:
   a mounting portion for accomodating a film cassette containing a plurality of monosheets to be successively brought to a foremost position for exposure to light through a camera lens,
   means for extracting exposed monosheets from said film cassette,
   means for simultaneously advancing and processing the exposed monosheets removed from said cassette by said extracting means,
   a pocket for accommodating the processed monosheets,
   means for directing the processed monosheets from said advancing and processing means into said pocket, said directing means comprising a feed roller means for feeding the processed monosheets into said pocket, and
   guide means for receiving the processed monosheets from said advancing and processing means and subsequently directing exposed monosheets to said feed roller means, said camera further comprising switch means for detecting the feeding of a monosheet by said feed roller means into said pocket and for stopping said feed roller means after a time delay to insure complete insertion of said monosheets into said pocket.

2. An auto-process camera comprising:

a mounting portion for accommodating a film cassette containing a plurality of monosheets to be successively brought to a foremost position for exposure to light through a camera lens, means for extracting exposed monosheets from said film cassette, means for simultaneously advancing and processing the exposed monosheets removed from said cassette by said extracting means, a pocket for accommodating the processed monosheets, means for directing the processed monosheets from said advancing and processing means into said pocket, said directing means comprising a feed roller means for feeding the processed monosheets into said pocket, and guide means for receiving the processed monosheets from said advancing and processing means and subsequently directing said exposed monosheets to said feed roller means, said guide means comprising a guide block shiftable between two positions, in one position of which said guide block receives therein processed monosheets from said advancing and processing means while in the other position, said guide block supplies processed monosheets therefrom to said feed roller means, and said camera further comprises means for automatically shifting said guide block sequentially from said one position to said other position in response to extraction of a processed monosheet from said film cassette.

3. An auto-process camera as defined in claim 2, further comprising an opening within said camera for loading of the cassette into said mounting portion, a back cover normally sealing said opening and selectively operable means for opening said back cover to provide access to said mounting portion.

4. An auto-process camera as defined in claim 3, wherein said pocket is provided on said back cover.

5. An auto-process camera as defined in claim 2, wherein said pocket comprises a removal slit through which the processed monosheets are removed from the camera.

6. An auto-process camera as defined in claim 2, wherein said extracting means comprises a drive motor for positive extraction of exposed monosheets from said film cassette.

7. An auto-process camera as defined in claim 6, further comprising means for detecting the complete removal of an exposed monosheet from said film cassette for stopping said drive motor.

8. An auto-process camera as defined in claim 2, wherein said advancing processing means comprises a pair of press rollers through which the exposed monosheets are passed.

* * * * *